Oct. 25, 1966  R. E. ANTROBUS  3,280,430
APPARATUS FOR MAKING CORRUGATED PLASTIC TUBING
Filed May 24, 1965  3 Sheets-Sheet 1

INVENTOR.
Robert E Antrobus
BY
ATTORNEY

Oct. 25, 1966    R. E. ANTROBUS    3,280,430
APPARATUS FOR MAKING CORRUGATED PLASTIC TUBING
Filed May 24, 1965    3 Sheets-Sheet 2
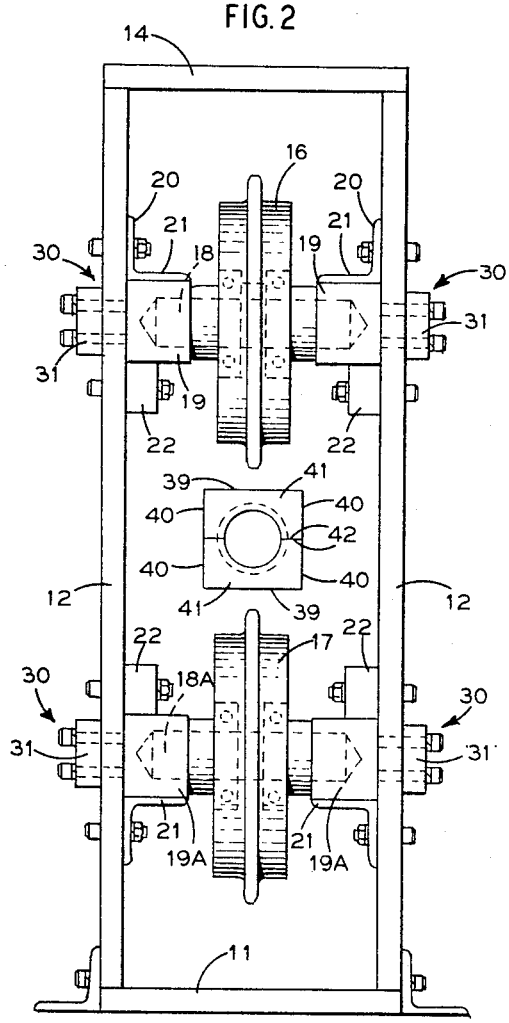
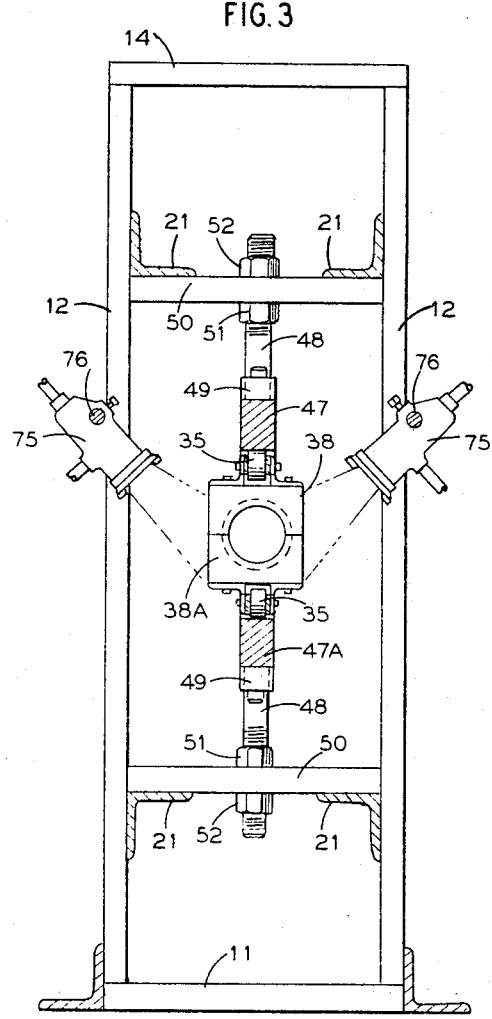
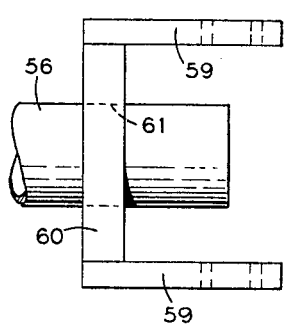
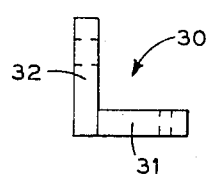

Oct. 25, 1966    R. E. ANTROBUS    3,280,430
APPARATUS FOR MAKING CORRUGATED PLASTIC TUBING
Filed May 24, 1965    3 Sheets-Sheet 3
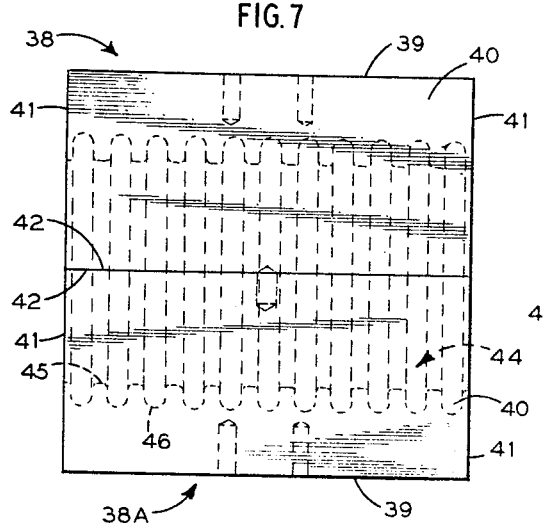
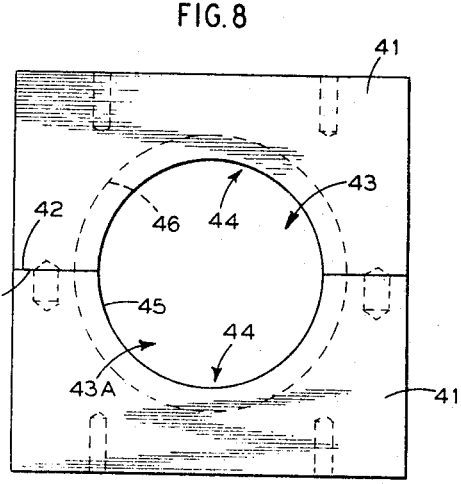
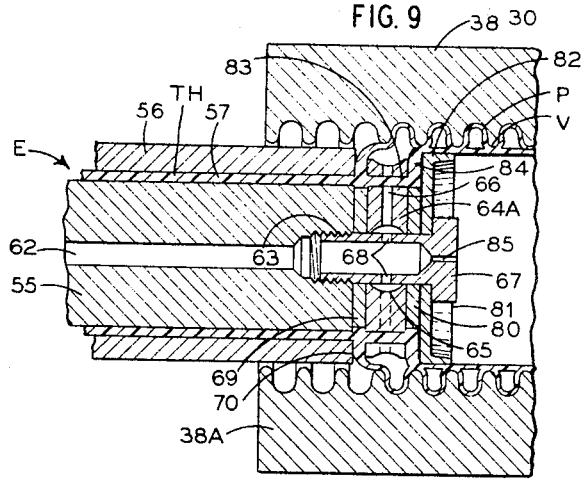
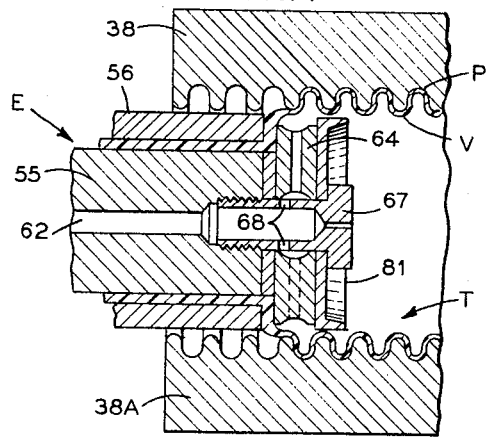

United States Patent Office 3,280,430
Patented Oct. 25, 1966

3,280,430
APPARATUS FOR MAKING CORRUGATED
PLASTIC TUBING
Robert E. Antrobus, Fairless Hills, Pa., assignor to Acme-Hamilton Manufacturing Corporation, Trenton, N.J., a corporation of New Jersey
Filed May 24, 1965, Ser. No. 457,955
9 Claims. (Cl. 18—14)

This invention relates to corrugated plastic tubing and more particularly, concerns apparatus and methods for forming such tubing, as well as the tubing per se.

Corrugated hose and tubing are conventionally formed on mandrels by a number of procedures known in the art. The use of mandrels necessarily limits the length of the tubing or hose and necessitates the use of coupling members when extended lengths of tubing are required.

Accordingly, an object of this invention is to provide improved apparatus and procedures for forming flexible, corrugated tubing of indefinite length, eliminating the use of mandrels and utilizing forming equipment which is compact and of relatively low cost, thereby providing for production economies.

A further object of this invention is to provide an improved flexible hose or tubing derived from thermoplastic resins and having a transversely corrugated wall structure made up of successive, alternating annular peak and valley portions, said tubing being of any desired length.

Still another object of this invention is to provide an improved flexible, corrugated annular tubing having an integral inner lining of smooth walled form, whereby such tubing provides for uninterrupted flow of liquids, gases or solids while maintaining flexibility in use.

Other objects of this invention will in part be obvious and in part hereinafter pointed out.

In the drawings:

FIG. 2 is an end elevational view thereof at one end thereof;

FIG. 3 is an end elevational view, with parts in section, at the other end thereof;

FIG. 4 is a longitudinal sectional view showing the association of the extruder portion and the molding portion of the apparatus;

FIG. 5 is a plan view showing a tension adjusting bracket forming part of the molding apparatus;

FIG. 6 is a plan view of a die locating ring forming part of the molding apparatus;

FIG. 7 is a side elevational view showing the die members forming part of the molding apparatus;

FIG. 8 is an end view thereof; and

FIG. 9 is a view similar to that of FIGURE 4 and showing a modification thereof.

Figure 1:
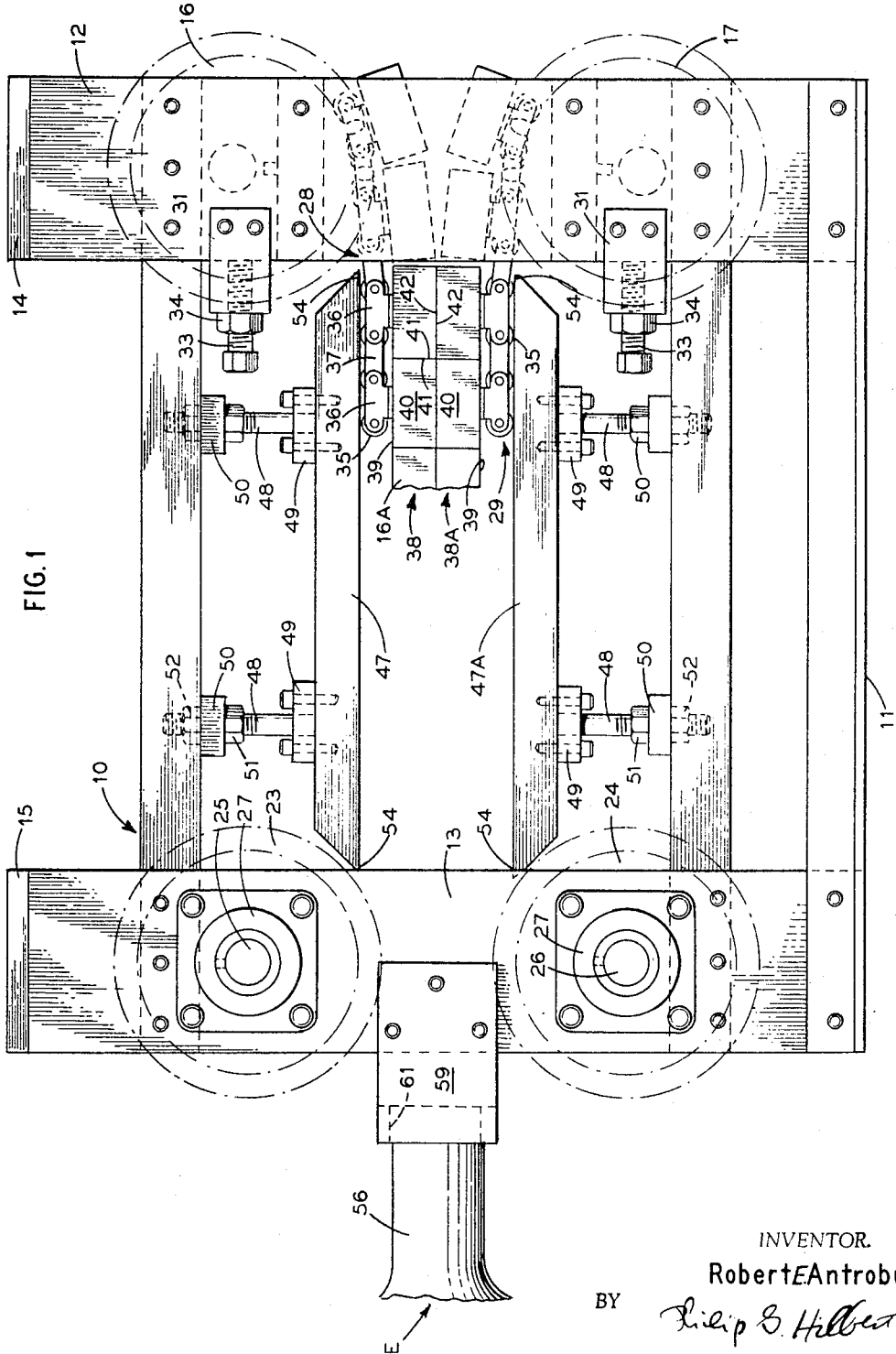
FIG. 1 is a side elevational view of the molding portion of the apparatus embodying the invention.

Essentially, the flexible corrugated plastic tubing of the instant invention is formed in apparatus comprising plastic extruding means for delivering a freshly extruded tubular body continuously to improved molding means operative to rapidly convert the wall of such body into transverse corrugations comprising alternating peak and valley portions.

Thus, as shown in FIG. 1, extruder means is generally indicated at E while the molding means is generally indicated at 10. The output nozzle of the extruder means E is only shown, the remainder of such device, conventional in the art, not being shown. The extruder means E is adapted to deliver freshly extruded plastic material, such as polyethylene or other suitable plastic, in tubular form, at elevated extruding temperatures to molding means 10, hereinafter described in detail.

The freshly extruded plastic material from extruder means E is in annular form which passes to molding means 10 where the same is molded to form corrugations therein and simultaneously moved in a longitudinal path and in a continuous manner, to take up means, such as a reel, not shown, where the finished corrugated tubing is wound and stored.

The molding apparatus 10 comprises a base member 11 in the form of a rectangular plate, with a pair of uprights 12 secured at their lower ends to opposite sides of base member 11, at the forward end thereof; and a second pair of uprights 13 similarly secured to base member 11 at the rear end thereof. Uprights 12 and 13 are respectively interconnected at their upper ends by horizontal members 14, 15 respectively.

Uprights 12 provide means for mounting therebetween vertically spaced sprocket wheels 16, 17. Said sprocket wheels 16, 17 have their shafts 18, 18A received at the opposite ends thereof in bearing blocks 19, 19A. Blocks 19, 19A are arranged for slidable movement. To this end, a pair of horizontally disposed angle bars 20 extend between uprights 12, 13 and are secured to the inner surfaces thereof with the horizontal arm portions 21 thereof bearing on one horizontal face of bearing blocks 19. Horizontal bars 22 interconnecting uprights 12, 13 engage the other horizontal face of bearing blocks 19. The lower bearing blocks 19A are similarly slidably supported between angle bars 20 and bars 22.

Uprights 13 support sprocket wheels 23, 24 whose shafts 25, 26 pass through openings in said uprights and are received in bearings 27 fixed to the outer surfaces of the uprights 13. Sprocket chains generally indicated at 28, 29 are entrained about the respective pairs of sprocket wheels 16, 23; 17, 24. Such chains 28, 29 are suitably tensioned by means of angle members 30, whose arms 31 are fixed to the outer surface of uprights 12, while the other arms 32 are disposed in rearwardly spaced relation to bearing blocks 19, 19A. Adjusting screws 33 threaded into through openings in arms 32, bear on the rear surfaces of slidable bearing blocks 19, 19A and are turned in the proper direction to suitably tension chains 28, 29. Lock nuts 34 on screws 33 serve to maintain said tension adjusting screws in their proper position.

Chains 28, 29 comprise the usual cross roller members 35 mounted on interpivoted link members 36, 37. The chains 28, 29 carry split molding means comprising die members 38, 38A in respectively opposed relation on opposed reaches of said chains. Each of said die members comprises a rectangular block having an outer surface 39, side surfaces 40, end surfaces 41 and an inner surface 42. Said blocks are formed with semi-circular mold cavities 43, 43A extending parallel to side surfaces 40 to the opposite end surfaces 41. The mold cavities 43, 43A are defined by mold surfaces 44 having a corrugated, longitudinally extending section, including alternating peak portions 45 and valley portions 46.

It will be apparent that as chains 28, 29 are moved about sprocket wheels 16, 23; 17, 24; successive die blocks 38, 38A fixed at their outer surfaces 39 to link members 36, will be brought with faces 42 in tightly abutting relation while surfaces 41 of adjacent blocks 38, 38A also abut, to form a continuous mold cavity of circular section with alternating annular molding surfaces defining peaks and valleys.

The opposed die blocks 38, 38A are held in tight abutting engagement during their travel together by pressure plates 47, 47A extending horizontally between uprights 12, 13 and in abutting contact with rollers 35 of sprocket chains 28, 29. Plates 47, 47A are mounted on studs 48 press fitted at their upper ends into openings in cross members 49 secured to said plates. The lower ends of studs 48 pass through cross members 50 and are locked in place by nuts 51, 52. Thus, plates 47, 47A may be adjusted to bring die blocks 38, 38A in tight engagement so as to form the unitary coacting mold cavities 43, 43A. The opposite ends of pressure plates 47, 47A are bevelled as at 54 to allow for smooth transition of the moving die blocks 38, 38A to and from sprocket wheels 16, 23; 17, 24.

Extruder means E comprises an elongated core member 55 and an annular jacket 56 concentric therewith and providing therebetween an annular passage 57 for passing the freshly extruded thermoplastic material TH from the means E. The forward end of the core 55 and jacket 56 is brought into alignment with the longitudinal axis of the path defined by moving die blocks 38, 38A, by a channel shaped member 58 whose parallel arms 59 are fixed to the outer surfaces of uprights 13. The cross portion 60 of member 58 is located rearwardly of the rear edges of uprights 13 and is formed with a central opening 61 to receive therein jacket 56 of extruder means E.

As shown in FIG. 9, the forward ends of core 55 and jacket 56 are coterminous. Core member 55 is formed with an axial air passage 62 terminating in an enlarged, threaded portion 63 at the forward end thereof. Means is provided for directing the extruded thermoplastic material TH in passage 57 radially outward the mold surfaces 44 of the paired die blocks 38, 38A. To this end, an annular orifice plate 64 having a central opening 65 therein of arcuate section and a plurality of radially extending air passages 66 extending from the periphery of said plate to opening 65, is mounted on the forward end of core member 55 by means of a nipple member 67 which passes through opening 65 in said plate and is threaded into enlarged recess 63.

The tubular wall of nipple 67 is formed with a plurality of vents 68 which provide communication between passage 62 and radial passages 66. A spacer plate 69 between the forward end of core member 55 and orifice plate 64, which has a diameter substantially equal to that of said core member, provides a radial outlet 70 which communicates with annular passage 57. The selected thickness of spacer plate 69 determines the amount of thermoplastic material TH which passes from outlet 70 to the die blocks 38.

It will be apparent, that with extruder means E in operation and providing an annular body of thermoplastic material TH which moves in passage 57 to outlet 70, at an elevated extruder temperature, said thermoplastic material is brought adjacent the molding surfaces 44 of the die blocks 38, 38A. Air at a pressure of about 5 p.s.i. from a source not shown, admitted to air passage 62 and passing radially outward of passages 66, is effective to conform the annular body of thermoplastic material to said mold surfaces 44 thereby forming annular corrugations in the wall thereof, including alternating peak portions P and valley portions V, corresponding to mold portions 45, 46 respectively. It is understood, that the forward free end of the extruded and molded corrugated tubing T is crimped or tied to make the same air tight, so that the air pressure in passages 62, 66 will be effective to conform the wall of the extruded plastic tubing to mold surfaces 44. As the successive pairs of die blocks 38, 38A move forwardly by means of sprocket chains 28, 29, the freshly formed corrugated tubing is rapidly cooled by means of a series of atomizer spray nozzles 75 mounted on brackets 76 fixed to uprights 12, 13; said nozzles 75 being directed at the exterior end surfaces 40 of die blocks 38, 38A, to apply atomized water sprays thereto, from water delivered to said nozzles by lines 77. Thus, the hot molded tubing is rapidly cooled within a relatively short time interval as measured by the length of the path of coacting die blocks 38, 38A.

The corrugated tubing T may be continuously reeled on suitable reel means, not shown. Obviously, the die blocks 38, 38A are coordinated with the size of the extruder core 55 and jacket 56 to form tubing of a desired diameter and depth of corrugation.

The plastic tubing formed may also be provided with a smooth, integral lining of the same plastic from which the tubing is formed. To this end, as shown in FIG. 9, the extruder means E is modified to include a second spacer plate 80 which may be substantially equal in diameter to that of spacer plate 69 and an annular wiper plate 81 having a diameter such as to bring a peripheral annular flange portion 82 thereof immediately adjacent the peak portions 45 of the die blocks 38, 38A.

In this case, the orifice plate 64A is formed with a series of through openings 83 located on a circle at a radius which will dispose said openings in communication with radial outlet 70 on one side thereof and with a second radial outlet 84 on the other side thereof which is defined by said orifice plate, space plate 80 and wiper plate 81.

Thus, extruded thermoplastic material from passage 57 is supplied at a rate to fill outlets 70 and 84, thereby forming the corrugated tubing T and simultaneously forming a lining L which is integrated with the valley portions V of tubing T by the action of wiper plate flange 82. Again, selection of spacer plate 80 will determine the thickness of the liner L. For the purpose of illustration, tubing T was formed of polyethylene plastic with the corrugated wall having a thickness of the order of .050″ and an integrated lining having a thickness of the order of .008″.

It has been found that with nipple 67 vented as at 85, to leak air into the formed tubing, the wall structure was stabilized during its travel with die blocks 38, 38A and the cooling operation.

As various changes might be made in the embodiment of the invention herein shown without departing from the spirit thereof, it is understood that all matter herein described or illustrated is not limiting except as set forth in the appended claims.

What is claimed is:

1. Apparatus for forming corrugated plastic tubing comprising in combination, extruding means for continuously forming plastic tubing of annular cross section, molding means immediately adjacent said extruding means for receiving the extruded plastic tubing at an elevated temperature and transversely corrugating the wall thereof, said molding means comprising a pair of endless chain assemblies respectively including endless chain means, said chain means being arranged with respective runs thereof extending longitudinally and in opposed relation to each other, a plurality of die members secured to each of said chain means in longitudinally adjacent relation to each other for movement therewith, means for guiding the movement of the opposed runs of said chain means to successively bring respectively opposed die members thereof into tight engagement with each other and to direct the longitudinal movement of the engaged die members, each die member having a mold cavity of semi-circular section formed with a longitudinally extending undulating mold surface whereby the paired, opposed die members form a mold cavity of circular section having a transversely corrugated mold surface, said extruding means including orifice means for directing the wall portions of the leading end of the extruded plastic tubing radially outward toward the mold surface of said die members, said orifice means including means for introducing air under pressure axially of said plastic tubing as said tubing is engaged by said pairs of die members whereby the wall of said tubing is urged into conformation with the mold surface of said die members to thereby continuously corrugate the tubing as it moves longitudinally with the successive pairs of opposed die members, and means for rapidly cooling the freshly corrugated plastic tubing during its engagement with said pairs of die members.

2. Apparatus as in claim 1 wherein said cooling means comprises a plurality of jet means arranged to direct water vapor at the longitudinally moving die members.

3. Apparatus as in claim 1 wherein said extruding means comprises longitudinally extending core means having a longitudinally extending air passage, an annular jacket about said core to provide an annular space therebetween for passing thermoplastic material at elevated temperatures therethrough, guide means comprising an orifice plate in axially spaced relation to the forward end of said core means for forming an annular passage therebetween for directing said thermoplastic material as an annular body radially outward towards the mold cavity of said die members, radial air passage means in said orifice plate in communication with the said air passage in said core member for urging said annular body of thermoplastic material into close conformation with the mold surface of said mold cavity of said die members.

4. Apparatus as in claim 3 and further including spacer means of selected axial dimensions between the forward end of said core member and said orifice plate for regulating the amount of thermoplastic material passing radially toward said mold cavity whereby to regulate the thickness of the corrugated wall of said tubing.

5. Apparatus as in claim 4 and further including second guide means at the forward end of said core means in forwardly spaced relation to said orifice plate forming therebetween a second annular passage for directing a second annular body of thermoplastic material radially outward of said extruding means to form an annular plastic lining integral with the valley portions of the freshly formed corrugated tubing.

6. Apparatus as in claim 5 and further including spacer means of selected axial dimension between said orifice plate and said second guide means for regulating the amount of thermoplastic material passing radially outward from said second annular passage to regulate the thickness of said annular lining.

7. Apparatus for forming transversely corrugated plastic tubing comprising in combination plastic extruder means and movable molding means coactive with said extruder means, said extruder means comprising an elongated core member having a longitudinally extending air passage therein, an annular jacket member disposed about said core member to provide an annular passage therebetween, the forward end of said jacket member being coextensive with the forward end of said core member, an annular member mounted on the forward end of said core member, said annular member having radial passages in communicating relation to the air passage in said core member, an annular spacer member between the forward end of said core member and said annular member, said annular spacer member having a diameter no greater than that of said core member, the forward end portion of said jacket member and the peripheral portions of said annular member and annular spacer member forming a radial outlet in communication with said annular passage, said molding means comprising split die members forming a mold cavity of circular cross section with transversely corrugated mold surface portions, means for moving said split die members in a longitudinal path, the forward end of said extruder means being located adjacent the rear portion of the path of said split die members, whereby thermoplastic material extruded from said radial outlet of said extruder means as an annular body is outwardly displaced by air under pressure from said radial air passages into conformation with the mold surface portions of said die members.

8. Apparatus as in claim 7 wherein said extruder means further includes a second annular spacer member disposed forwardly of and in contact with said annular member, and a second annular member disposed forwardly and in contact with said second annular spacer member, said first and second annular members and said second annular spacer member therebetween forming a radial annular outlet, said first annular member being formed with transversely extending through openings to provide for communication between said annular passage and said second radial annular outlet, whereby thermoplastic material may be extruded in annular form for adherence to the valley portions of the said corrugated plastic tubing.

9. Apparatus as in claim 8 wherein said second mentioned annular member comprises an annular flange portion at the periphery thereof for wiping engagement with the last mentioned annular body of thermoplastic material.

References Cited by the Examiner

UNITED STATES PATENTS

| | | | |
|---|---|---|---|
| 2,728,356 | 12/1955 | Brinsmade et al. | 138—121 |
| 2,898,941 | 8/1959 | Kilcup | 138—121 |
| 2,957,201 | 10/1960 | Fields et al. | 18—12 |
| 3,051,990 | 9/1962 | Peterson | 18—14 |
| 3,169,272 | 2/1965 | Maxson | 18—12 |
| 3,184,358 | 5/1965 | Utz | 18—14 |
| 3,188,690 | 6/1965 | Zieg | 18—12 |

FOREIGN PATENTS

| | | |
|---|---|---|
| 888,615 | 1/1962 | Great Britain. |

WILLIAM J. STEPHENSON, *Primary Examiner.*